United States Patent
Abraham et al.

(10) Patent No.: US 7,793,492 B2
(45) Date of Patent: Sep. 14, 2010

(54) DIESEL ENGINE EXHAUST AFTER-TREATMENT OPERATOR INTERFACE ALGORITHM

(75) Inventors: Mark A. Abraham, Indianapolis, IN (US); Douglas M. Hammond, Davison, MI (US); Rodger M. Miller, Fort Wayne, IN (US); John F. Rotz, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 792 days.

(21) Appl. No.: 11/679,412

(22) Filed: Feb. 27, 2007

(65) Prior Publication Data

US 2008/0208431 A1     Aug. 28, 2008

(51) Int. Cl.
*F01N 3/00* (2006.01)

(52) U.S. Cl. ............................ 60/295; 60/278; 60/280; 60/297; 60/300; 60/311; 701/102; 701/115

(58) Field of Classification Search ............... 60/274, 60/278, 280, 285, 295, 297, 300, 311; 701/102, 701/115
See application file for complete search history.

(56) References Cited

U.S. PATENT DOCUMENTS

| | | | |
|---|---|---|---|
| 6,497,095 B2 | 12/2002 | Carberry et al. | |
| 6,829,890 B2 | 12/2004 | Gui et al. | |
| 6,978,604 B2 | 12/2005 | Wang et al. | |
| 7,043,903 B2 * | 5/2006 | Onodera et al. | |
| 7,260,930 B2 * | 8/2007 | Decou et al. | 60/295 |
| 7,353,648 B2 * | 4/2008 | Zhang | 60/278 |
| 7,421,837 B2 * | 9/2008 | Abe | 60/295 |
| 7,484,357 B2 * | 2/2009 | Dollmeyer et al. | 60/274 |
| 7,500,358 B2 * | 3/2009 | Singh et al. | 60/295 |

* cited by examiner

*Primary Examiner*—Binh Q. Tran
(74) *Attorney, Agent, or Firm*—Jeffrey P. Calfa; Mark C. Bach

(57) ABSTRACT

A motor vehicle operator interface and control algorithm convey diesel particulate filter regeneration status to the operator. The algorithm also allows new control over heretofore automatic regeneration, through limiting the inhibit function. The DPF after-treatment operator interface provides multiple status indications to the operator. In a preferred embodiment this is effected using a switched indicator lamp.

7 Claims, 6 Drawing Sheets

DIESEL ENGINE EXHAUST AFTER-TREATMENT OPERATOR INTERFACE ALGORITHM

BACKGROUND OF THE INVENTION

1. Technical Field

The invention relates to operator control over diesel engine exhaust particulate filter regeneration.

2. Description of the Problem

Electronic engine control systems are known which provide processor-based engine controllers that process data from various sources to develop control data for controlling certain functions of the engine. The interaction of such control systems with more general vehicle control networks, typically controller area networks (CAN), is also known. The state of development in the art is represented by the development by the Society of Automotive Engineers of several standards, most particularly the SAE J1939 standard governing vehicle control networks. The SAE J1939 standard seeks to assure, among other things, the seamless interaction of different manufacturers' engine controllers over such networks with other controllers.

The context of the present invention is the handling of diesel particulate filter (DPF) regeneration. DPF's trap Diesel Particulate Matter (DPM) includes soot or carbon, the soluble organic fraction (SOF), and ash (i.e. lube oil additives etc.). The trapping of those constituents by a DPF prevents what was once seen as black smoke billowing from a vehicle's exhaust pipe. The organic constituents of trapped DPM, i.e. carbon and SOF, are oxidized within the DPF at appropriate times and under appropriate conditions to form $CO_2$ and $H_2O$, which can then pass through and exit the exhaust pipe to atmosphere. The ash collects within the DPF over time, progressively aging the DPF by gradually reducing its trapping efficiency.

DPF regeneration is typically handled by the engine controller. The reasons for locating control in the engine controller stem from the fact that regeneration requires the combustion or oxidation of the carbon rich particles which have built up in the DPF. One way to regenerate a DPF involves raising the temperature in the filter to the ignition temperature of a substantial portion of the particles and supplying enough oxygen (the conventional oxidizer) or $NO_2$ (a possible oxidizer) to the filter to support combustion. While there are several techniques used to start such combustion, most involve changing physical attributes or chemical mix of the exhaust stream into the DPF. Among the quantities that can be controlled are: temperature of the stream; the quantity of oxygen in the stream; and the amount of supplemental fuel in the stream (the supplemental fuel can have a lower combustion initiation temperature). All of these conditions can be affected by manipulating engine operation.

The rate at which trapped carbon is oxidized to $CO_2$ is controlled not only by the concentration of $NO_2$ or $O_2$ but also by temperature. Specifically, there are three important temperature variables for a DPF. The first is the oxidation catalyst's "light off" temperature, below which catalyst activity is too low to oxidize HC. That temperature is typically around 180-200 degrees Celsius. The second controls the conversion of NO to $NO_2$. This NO conversion temperature spans a range of temperatures having both a lower bound and an upper bound, which are defined as the minimum temperature and the maximum temperature at which 40% or greater NO conversion is achieved. The conversion temperature window defined by those two bounds extends from approximately 250 degrees C. to approximately 450 degrees C. The third temperature variable is related to the rate at which carbon is oxidized in the filter. Reference sources in relevant literature call that temperature the "Balance Point Temperature" (or BPT). It is the temperature at which the rate of oxidation of particulate, also sometimes referred to as the rate of DPF regeneration, is equal to the rate of accumulation of particulate. The BPT is one of the variables that is especially important in determining the ability of a DPF to enable a diesel engine to meet expected tailpipe emissions laws and/or regulations.

A typical diesel engine comprises fuel injectors for injecting fuel into the engine cylinders under control of an engine control system. The engine control system controls the duration, timing, quantity and potentially the charge shape of each pulse. These factors can be varied to control completeness of combustion, the quantity of oxygen in the exhaust, the amount of unburned fuel in the exhaust and the temperature of the exhaust. In a turbocharged diesel engine, the electronic engine control system also exercises control over turbocharger boost to vary the amount of oxygen being delivered.

Typically, a diesel engine runs relatively lean and relatively cool compared to a gasoline engine. That factor makes natural achievement of BPT problematic. Therefore, a manufacturer of a DPF for a diesel engine should strive for a design that minimizes BPT, and a diesel engine manufacturer should strive to develop engine control strategies for raising the exhaust gas temperature to temperatures in excess of BPT whenever the amount of trapped particulates exceeds some threshold that has been predetermined in a suitably appropriate manner, such as by experimentation. Using an engine control to raise exhaust gas temperature in this way is a type of regeneration.

Investigation of several methods for initiating a forced regeneration of a DPF has disclosed that retarding the start of main fuel injections seems to be the most effective way to elevate exhaust gas temperature. That method is able to increase the exhaust gas temperature sufficiently to elevate the catalyst's temperature above catalyst "light off" temperature and provide excess HC that can be oxidized by the catalyst. Such HC oxidation provides the necessary heat to raise the temperature in the DPF above the BPT.

The diesel trucking industry is developing operator interfaces for their respective 2007 EPA-mandated Diesel Particulate Filter (DPF) aftertreatment systems. These interfaces may control two basic aftertreatment operations: allow a particulate trap regeneration, and inhibit a particulate trap regeneration. Operator interfaces for such systems have typically provided only a Particulate Trap Warning lamp, and a High Exhaust Temperature System Warning lamp.

U.S. Pat. No. 6,497,095 discussed circumstances under which automatic initiation of regeneration might be inhibited. That patent provided for such inhibition in response to low fuel reserves, a consequence of the fact that most regeneration methods involve increased fuel flow.

SUMMARY OF THE INVENTION

The present invention is implemented using contemporary vehicle control systems, and in the preferred embodiment is implemented using a controller area network conforming to the SAE J1939 standard. The algorithm of the present invention supplements this preexisting feature of contemporary vehicle control architecture to provide an operator interface conveying DPF regeneration status to the operator. The algorithm also allows new control allowing-inhibiting over heretofore automatic regeneration.

The DPF after-treatment operator interface provides multiple status indications to the operator. In a preferred embodiment this is effected using a switched indicator lamp. In the preferred embodiment a slow blinking switch indicates that particulate trap regeneration is prevented by an interlock, or the engine software is unavailable or incorrect. A fast blinking switch indicator lamp conveys that the J1939 link has been lost (loss of message communication to the engine). A continuously illuminated lamp solid switch indicator shows that particulate trap regeneration is occurring. When the solid switch indicator transitions from solid to off, the regeneration has finished. The algorithm of the present invention inhibits particulate trap regeneration under certain conditions. The inhibit signal is only allowed during a window delimited by a top and bottom vehicle speed. For example: an operator may choose to inhibit the regeneration during low speeds, but when the operator increases the vehicle speed, the inhibit function will cease (allowing the engine to initiate automatic regeneration), and the operator will be notified by the inhibit switch indicator slow blinking. The operator is also notified when the communication to the engine is lost by the fast flash of the inhibit switch indicator. The operator is notified when an inhibit is successful.

SAE J1939 documentation specifies that the inhibit function takes precedence over the request for regeneration function. We have developed an algorithm that meets this requirement, while allowing the operator to intuitively choose the after-treatment function using a "last-in, first out" algorithm.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
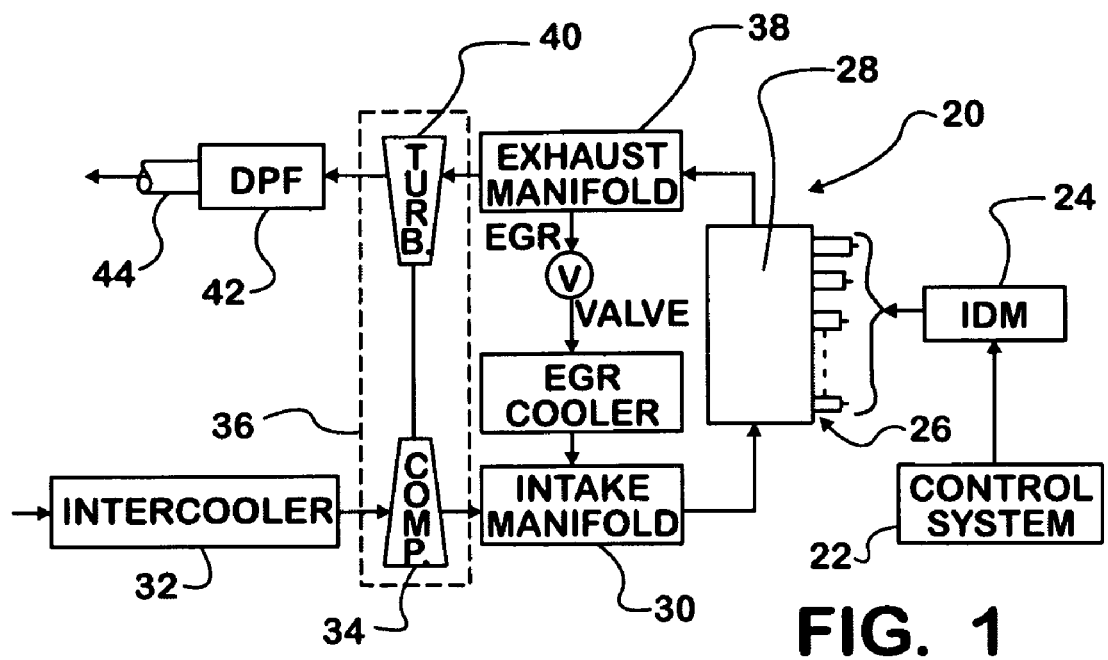
FIG. 1 is a general schematic diagram of an exemplary diesel engine having an engine controller which provides engine operation supporting forced regeneration of a diesel particulate filter in accordance with principles of the present invention.

FIG. 1 shows a schematic diagram of an exemplary diesel engine 20 for powering a motor vehicle. Engine 20 has a processor-based engine control system/engine controller 22 that processes data from various sources to control various aspects of engine operation. The data processed by engine controller 22 may originate at external sources, such as sensors or received over a network bus, and/or be generated internally.

Engine controller 22 includes an injector driver module 24 for controlling the operation of electric-actuated fuel injectors 26 that inject fuel into combustion chambers in the engine cylinder block 28. A respective fuel injector 26 is associated with each cylinder and comprises a body that is mounted on the engine and has a nozzle through which fuel is injected into the corresponding engine cylinder. A processor of engine control system 22 can process data sufficiently fast to calculate, in real time, the timing and duration of injector actuation to set both the timing and the amount of fueling.

Engine 20 further comprises an intake system having an intake manifold 30 mounted on block 28. An intercooler 32 and a compressor 34 of a turbocharger 36 are upstream of manifold 30. Compressor 34 draws air through intercooler 32 to create charge air that enters each engine cylinder from manifold 30 via a corresponding intake valve that opens and closes at proper times during engine cycles.

Engine 20 exhausts combustion by product under pressure to an exhaust system for eventual release, after treatment, to the atmosphere. The exhaust system comprises an exhaust manifold 38 mounted on block 28. Exhaust gases pass from each cylinder into manifold 38 via a respective exhaust valve that opens and closes at proper times during the composition cycle. The exhaust system further includes an exhaust turbine 40 and a diesel particulate filter 42.

Turbocharging of engine 20 is accomplished by turbocharger 36 that further comprises a turbine 40 in the exhaust system and coupled via a shaft to compressor 34 in an intake system. Hot exhaust gases acting on turbine 40 cause the turbine to operate compressor 34 to develop the charge air that provides boost for engine 20.

Figure 2:
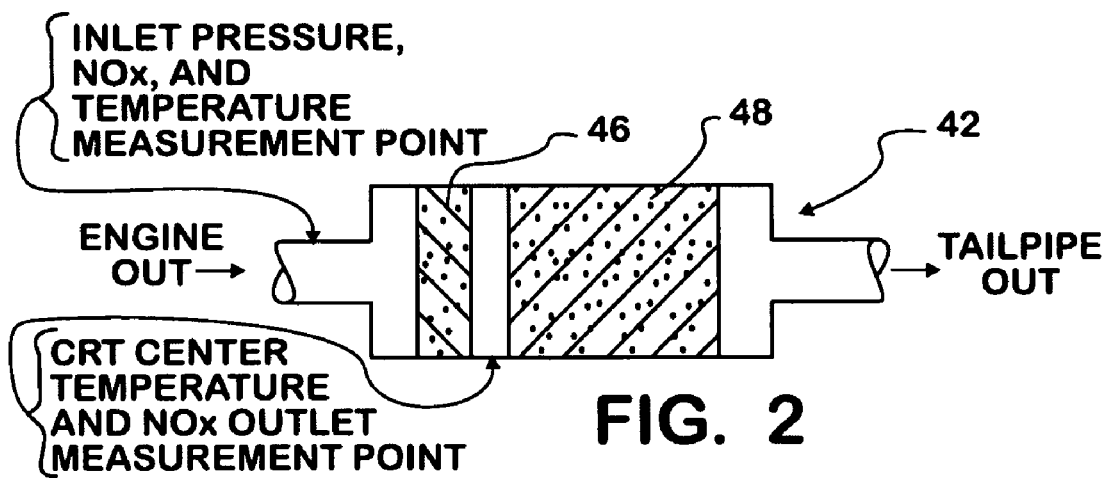
FIG. 2 is a semi-schematic drawing of a particulate filter.

The exhaust system further comprises a diesel particulate filter or trap DPF 42 downstream of turbine 40 for treating exhaust gas before it passes into the atmosphere through an exhaust pipe 44. The DPF shown in FIG. 2 is representative of the "Continuously Regenerating Trap". It comprises an oxidation catalyst 46 disposed upstream of a non-catalyzed DPF 48. DPF 48 physically traps a high percentage of DPM in exhaust gas passing through it, preventing the trapped DPM from passing into the atmosphere. Oxidation catalyst 46 oxidizes hydrocarbons (HC) in the incoming exhaust gas to CO2 and H2O and converts NO to NO2. The NO2 is then used to reduce the carbon particulate trapped in DPF 48.

Figure 3:
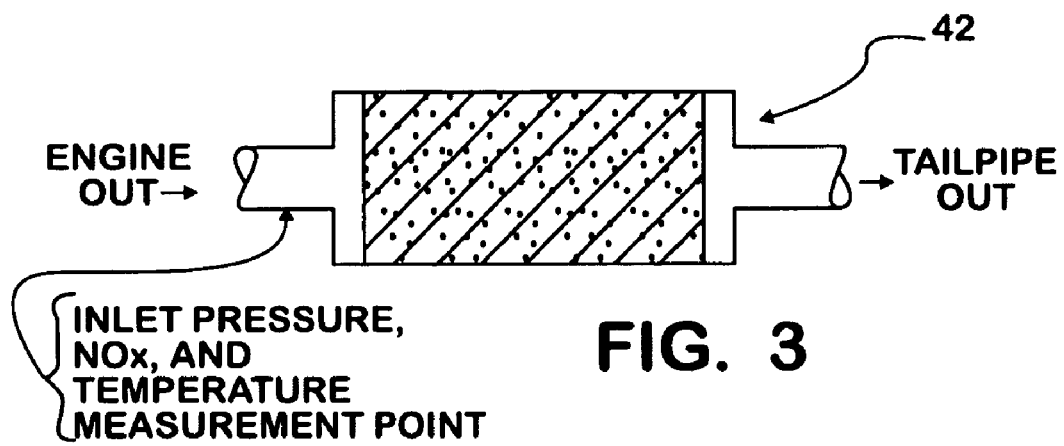
FIG. 3 is a semi-schematic drawing of another particulate filter.

The DPF 42 shown in FIG. 3 is representative of another type of DPF (or CSF) having an additional $CeO_2$ catalyst that makes it less dependent on $NO_2$ for oxidizing trapped particulate. It has a single substrate 50 that combines an oxidation catalyst with a trap, thereby eliminating the need for a separate upstream oxidation catalyst as in the DPF 42 shown in FIG. 2. As exhaust gases are passing through substrate 50, DPM is being trapped, and the oxidation catalyst is oxidizing hydrocarbons (HC) and converting NO to $NO_2$, with the $NO_2$ being used to oxidize the trapped carbon.

Figure 4:
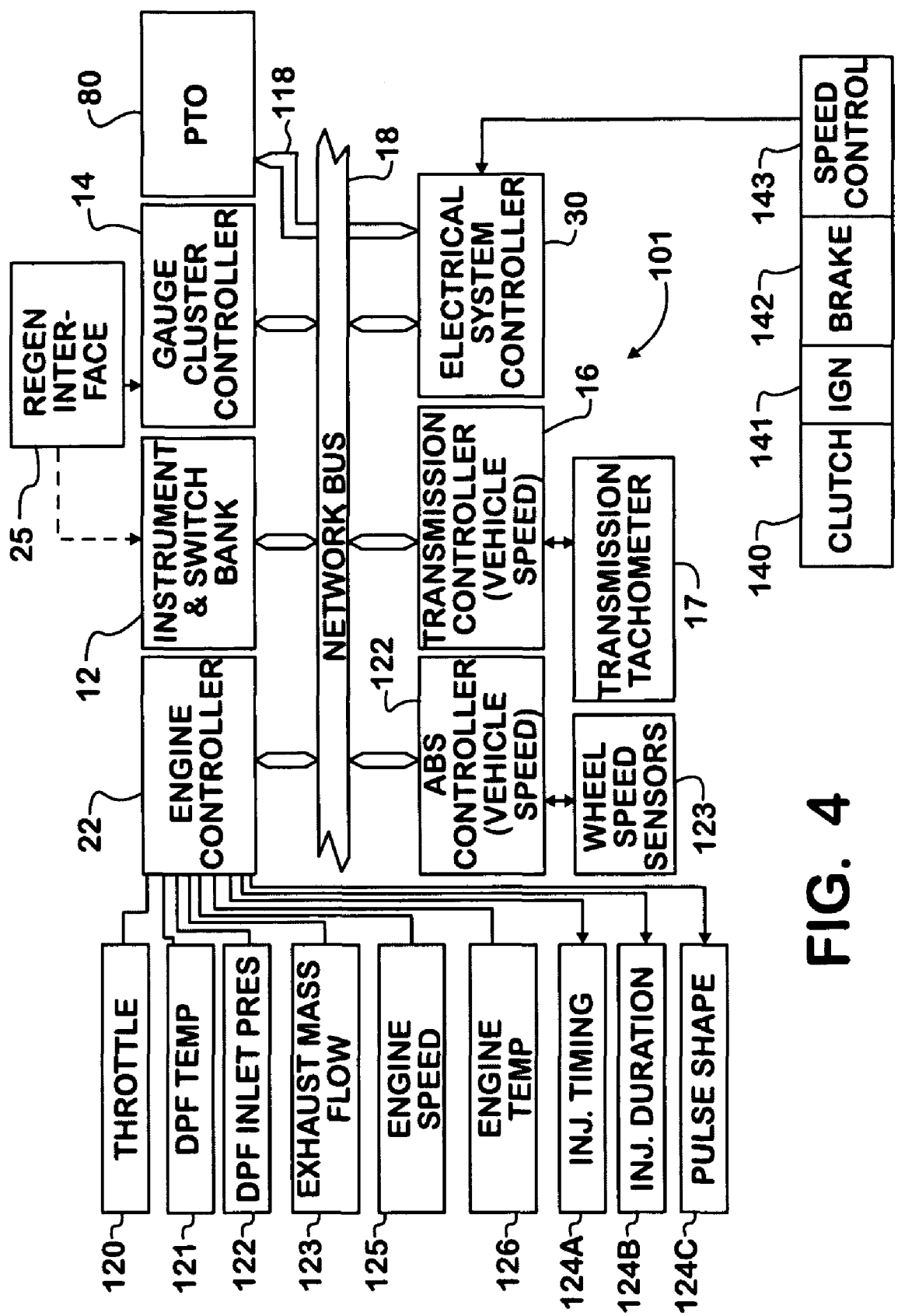
FIG. 4 is a high level schematic of a vehicle controller area network.

Control of regeneration of the illustrated DPF 42 is implemented through the engine controller, in part responsive to data received over a controller area network (CAN) 101 from diverse controllers attached to a system bus 18 forming the backbone of the CAN 101. Referring to FIG. 4 it may be seen that engine controller 22 is coupled to receive from a series of sensors, data relating to variables required for initiating and controlling filter regeneration. The sensors provide throttle position 120, DPF temperature 121 (which may be exhaust temperature), DPF inlet pressure (related to soot loading) 122, exhaust mass flow 123, engine speed (tachometer) 125

(typically a cam shaft rotational position sensor which is required for determining injection timing), and soot load information 126. The engine controller 22 provides through the injection controller 24 injection timing, duration and shape (124A-C). Changes in injection, particularly timing (such as injection occurring after peak pressure or post ignition injection) can be used to increase exhaust temperature or insert unburned fuel into the exhaust stream and thereby support DPF regeneration. As described above, operating conditions of the turbosupercharger 36 may also be varied. The particular method of regeneration used is not an essential part of the invention other than it is put into effect by the engine controller 22.

The need for regeneration is determined by the soot load. Typically a surrogate is used for soot load such as DPF inlet pressure 122, which is related to exhaust back pressure independent of changes in engine output. Circumstances under which regeneration is possible, or allowed, may be determined from a variety of sources. Engine operating conditions, as provided by the throttle position, engine speed (i.e. tachometer signal) or engine temperature may all be relevant depending upon the regeneration method used. However, vehicle operating conditions may also be relevant. Engine controller 22 is supplied with CAN messages over network bus 18 relating to vehicle operating conditions. For example, an anti-lock brake system (ABS) controller 122 may supply vehicle speed as determined from the wheel speed sensors 123. The same value may also come from a transmission controller 16 which generates a speed signal from a transmission tachometer 17 (the output from the tachometer 17 may also be supplied directly to the engine controller 22). On automatic transmission equipped vehicles the transmission controller 16 also provides indication of which gear the vehicle is in. If the vehicle is equipped for power take off (PTO) operation, indication that PTO operation has been invoked may be provided indirectly from a PTO controller 80 over a private bus 118 connecting the PTO controller to an electrical system controller 30 (ESC) which places the signal onto the public J1939 network bus 18. Operator inputs relating to regeneration control are typically received by engine controller 22 from a gauge cluster controller 14, though they could be connected to the network bus 18 through instrument and switch bank controller 12. ESC 30 is connected directly to a series of switches (or switch ladders) possibly affecting regeneration including a clutch pedal position switch 140, an ignition position switch 141, a park brake position switch 142 and a speed control ladder network 143.

Operator control over regeneration is implemented through an interface 25 connected to a gauge and cluster controller 14 (or, alternatively to an instrument and switch bank controller 12). Interface 25 provides at least two switches, including a regeneration inhibit switch 701 and a parked regeneration switch (or "forced regeneration switch") 601 along with indicator lights 60, 50, associated with each switch. The controllers communicate with other vehicle controllers over bus 18.

Figure 5:
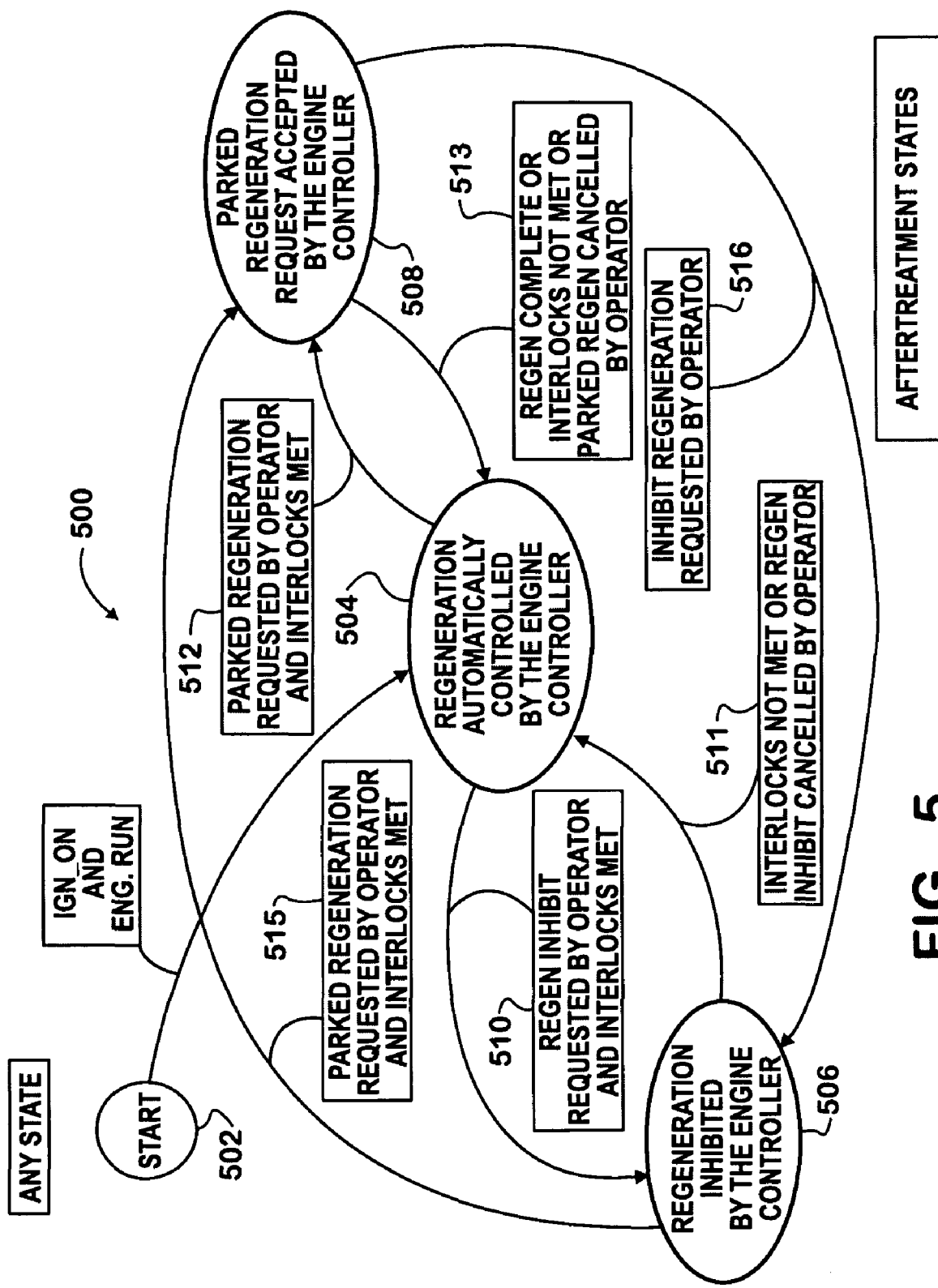
FIG. 5 is a state diagram illustrating the principles of the invention.

FIGS. 5-8 graph the state machines implementing the algorithm of the invention. The algorithms determine when DPF regeneration is in progress, or when a DPF regeneration has been inhibited, and alert the operator to system conditions. As seen in FIG. 5 from state machine 500, the state machine is entered from start 502 by the ignition 141 being in the "ON" condition and the engine running, which is known to the engine controller 22. At the highest level of abstraction there are three states 504, 506, 508: (1) Regeneration automatically controlled by the engine controller 22; (2) Regeneration inhibited by the engine controller 22; and (3) Request to force regeneration accepted by the engine controller 22. The interlock conditions mentioned in the various transition condition definitions relate to other vehicle conditions being met under which regeneration is allowed.

Several CAN messages are identified in the State machines. They include:

SPN 3695 Particulate Trap Regeneration Inhibit Switch

This signal indicates the state of the switch (Regeneration Inhibit Switch 701) that inhibits particulate trap regeneration. When this message assumes a not active value regeneration is allowed to occur normally.

SPN 3696 Particulate Trap Regeneration Force Switch (Parked Regen)

This signal indicates the state of the switch available to the operator to force particulate trap regeneration.

SPN 3697 Particulate Trap Lamp Command

SPN 3700 Particulate Trap Active Regeneration Status

This signal indicates if regeneration is occurring.

SPN 3702 Particulate Trap Active Regeneration Inhibited Status

This message indicates the reason for regeneration not being initiated or terminated prior to completion.

SPN 3703 Particulate Trap Active Regeneration Inhibited Due to Inhibit Switch Beginning with the default automatic regeneration control state 504 entered on engine-start it is seen that transitions are allowed to either of the other two major states. The regeneration inhibited state 506 follows occurrence of a regeneration inhibit request by the operator entered through the regeneration interface 25, provided that various interlocks are met (transition conditions 510). The regeneration inhibited state 506 is maintained only if the transition conditions 510 are met. Once they are not met (condition 511) the state returns to automatic control state 504.

Next, transition 512 from automatic regeneration state 504 to the park regeneration request accepted state 508 occurs when a parked regeneration of the DPF is requested by an operator and another set of interlocks is met (transition conditions 512). A return transition from state 508 to state 504 occurs under transition conditions 513. Condition set 513 is essentially the negative of transition conditions 512 or completion of regeneration.

It is also possible for transitions to occur directly between states 506 and 508. Transition from the regeneration inhibited state 506 to the parked regeneration accepted state 508 occurs when conditions 515 are met, which are basically the same conditions as condition set 512. The transition path from the parked regeneration request state accepted state 508 back to the regeneration inhibited state 506 occurs upon the inhibit regeneration request condition 516 occurring upon entry of such a request by an operator.

Figure 6:
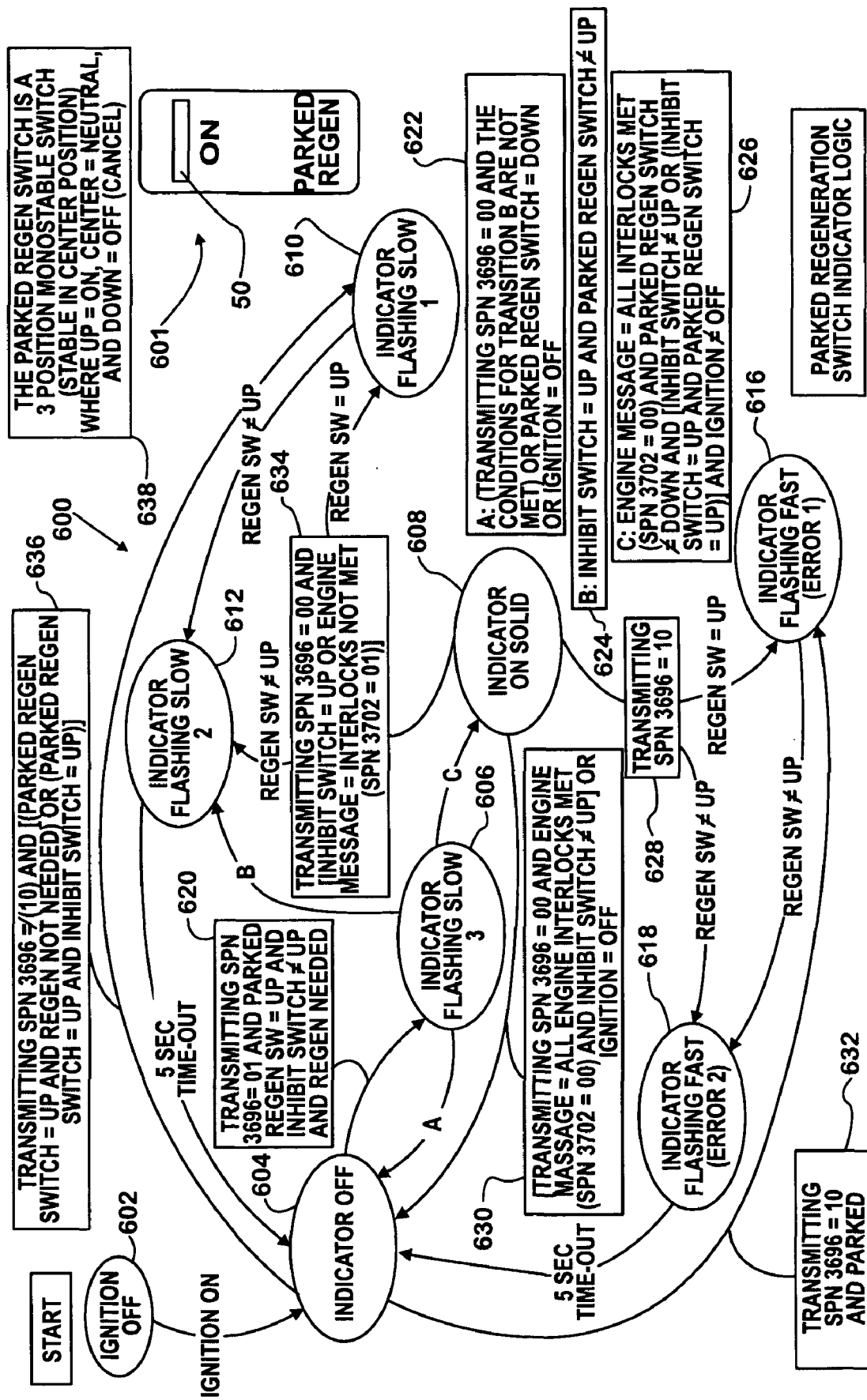
FIG. 6 is a state diagram illustrating the principles of the invention.
Figure 7:
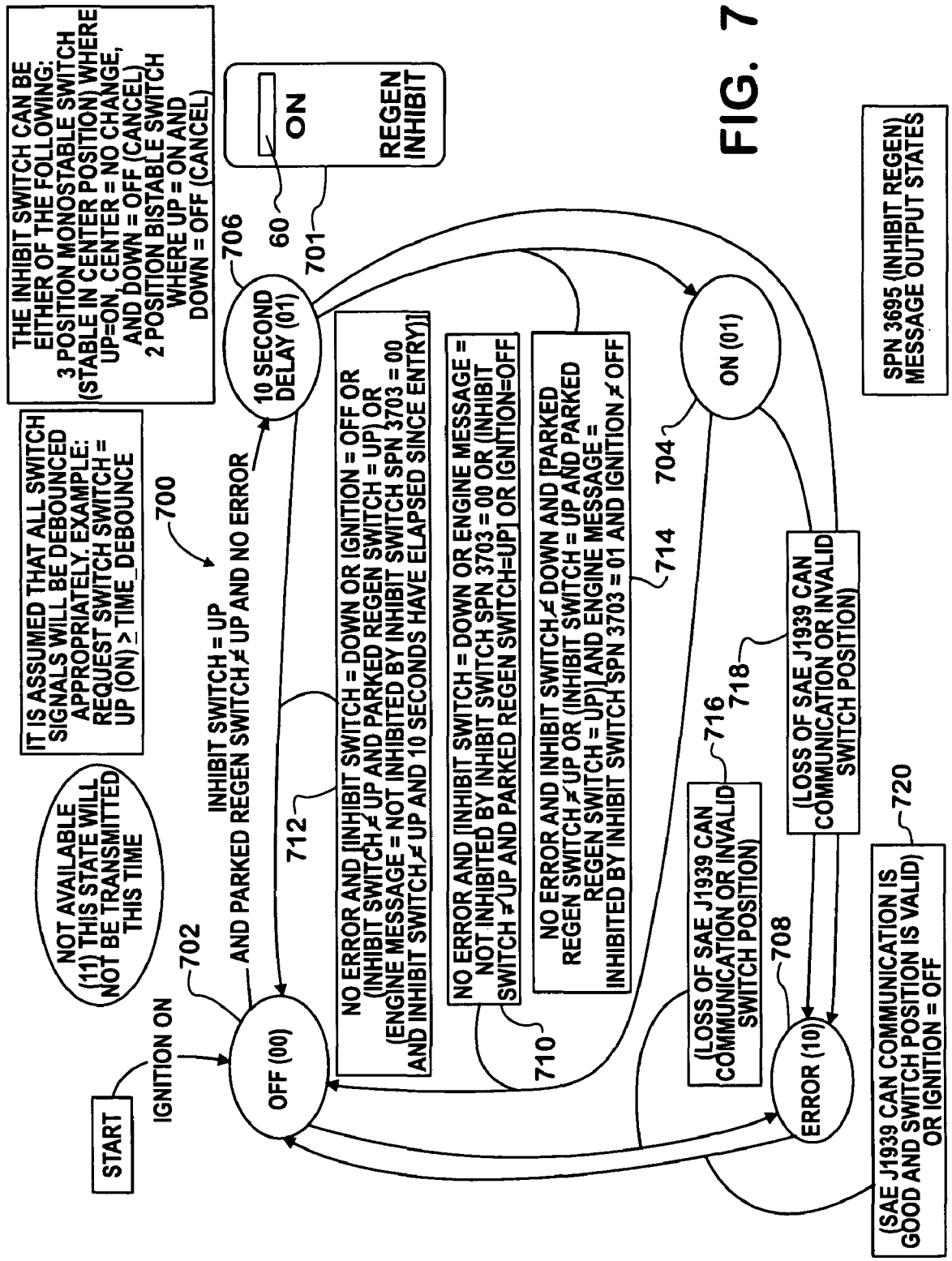
FIG. 7 is a state diagram illustrating the principles of the invention.

Referring to FIGS. 6 and 7, indicators 50, 60 are used to indicate operating status of a diesel particulate filter by changes in flash rates of the indicators. In the preferred embodiment a slow blinking switch indicates that particulate trap regeneration is prevented by an interlock, or the engine software is unavailable or incorrect. A fast blinking switch indicator 50 conveys that the J1939 link has been lost (loss of message communication to the engine), that is, an error condition. A continuously illuminated lamp indicator 50 shows that particulate trap regeneration is occurring. When the solid switch indicator 50 transitions from solid to off, the regeneration has finished. The inhibit signal is only allowed during a window delimited by a top and bottom vehicle speed. For example: an operator may choose to inhibit the regeneration during low speeds, but when the operator increases the vehicle speed, the inhibit function will cease (allowing the engine to initiate automatic regeneration), and the operator will be notified by slow blinking of the indicator 60. The operator is also notified when the communication to the engine is lost by the fast flash of the inhibit switch indicator 60. The operator is notified when a request to inhibit regeneration is successful.

FIG. 6 illustrates a state machine 600 for illumination control of the back lit indicator 50 of a parked regeneration request switch 601 installed in the operator interface 25. The parked regeneration request switch 601 is a three position mono-stable switch where Up equals ON, Down equals OFF (Cancel) and center is NEUTRAL. Switch 601 is stable in the center position. With movement of the ignition switch 141 to the one state entry to the state machine 600 from an ignition off state 602 to an indicator 50 off state 604 occurs.

From state 604 three transitions are possible, to an Indicator 50 flashing "fast" state 616, to an Indicator 50 flashing "slow" state 610 and to another Indicator 50 flashing "slow" state 606. Indicator 50 flashing "slow" state 606 corresponds to a ready condition for initiating DPF regeneration and occurs only following the Indicator OFF state 604 following simultaneous occurrence of four conditions 620: (1) the CAN message (SPN 3696=01) is present indicating the operator has requested forcing regeneration; (2) the Parked Regeneration Switch 601 has been at least momentarily closed ON (or UP); (3) the Inhibit switch 701 has not been closed ON or UP; and (4) Regeneration is needed as indicated by the engine controller 22. The CAN SPN 3696 message value is set in response to operator use of the parked regeneration switch as defined below with reference to FIG. 8.

From state 606 various intervening conditions may occur which prevent transition to the indicator ON state 608. These factors include closure of the Inhibit switch 701 and engine controller 22 unavailability or failure of a selected CAN message to set to the appropriate value (SPN 3702=01, i.e. inhibited). Obviously then a state transition from "slow" flashing (state 606) to a state 608 of constant illumination of indicator 50 occurs under the conditions 626 when all interlocks have been met, the Parking Regeneration Switch has not been closed down or OFF and the inhibit switch 701 has not been closed up or ON and the ignition has not been turned OFF. Additionally, the operator is enabled to over ride the inhibit switch 701 by a subsequent activation of the Parking Regeneration switch 601. Accordingly, the transition from state 606 to state 608 also occurs, notwithstanding the fact that the inhibition switch has been closed UP, if the Regeneration switch is also closed ON or up contemporaneously or afterward.

The remaining two transitions from the Indicator 50 "slow" flashing state 606 are in essence aborts. The state returns to Indicator 50 OFF when condition set 622 is met. Condition set 622 provides SPN 3696=00, i.e. not active) and that the conditions for transition to state 608 are not met. Alternatively, if either the parked regeneration switch is depressed downwardly or OFF, or the ignition 141 is turned OFF, then the state transits to Indicator OFF state 604. The state returns to Indicator 50 flashing "slow" state 612 under condition set 624, that is where an intervening actuation of the inhibit switch 701 has occurred (without an override by subsequent depression of the Parked Regeneration Switch 701).

Five transitions from the Indicator 500N state 608 exist. These transitions include a transition to the Indicator 50 flashing "slow" state 610, a transition to Indicator 50 flashing "slow" state 612, transition back to Indicator 50 OFF state 604, and transitions to the error states, Indicator 50 flashing "fast" states 616 and 618. Condition set 630 defines when the transition from state 608 to state 604 occurs. One such condition is simply turning the ignition 141 off. The transition also occurs upon a concurrent combination of events including transmission of the SPN 3696=00 message and all engine interlocks being met and the inhibit switch 701 not being UP.

Error conditions (SPN 3696=10) 628 can arise with the Regeneration switch 601 being UP or it being not UP. If the Regeneration switch 601 is not UP when a fault condition arises a transition from state 608 to the Indicator 50 flashing fast state 618 occurs. If the Regeneration switch 601 is UP the transition to Indicator 50 flashing "fast" state 616 occurs. The reason for two error states relates only to the exit conditions from the states. As long as the Parked Regeneration switch 601 is held UP, flashing of the indicator 50 continues. When the switch in longer up flashing discontinues after a five second time out. Hence a transition from state 616 to state 618 is provided upon release of the parked Regeneration switch from the UP position. Indicator 50 flashing "fast" is reached from the Indicator OFF state 604 under an identical set of conditions 632 to those by it is reached from the Indicator on continuously state 608.

Indicator 50 "slow" flashing states 610, 612 will now be described. These states may be reached under conditions where regeneration would be allowed, but is not needed, among other events. The difference between states 610, 612 is only the exit condition between from the states. Exit from state 612 is only to the Indicator OFF state 604 and occurs after a time out event. Exit from state 610 is only to "slow" flashing state 612 and occurs upon release of the Parked Regeneration switch 601 from its "UP" position. A transition path is provided from the Indicator OFF state 604 to the Indicator 50 "slow" flashing state 610 based on the condition set 636 which outlines two subsets of events for the transition. Both subsets include that the no error condition has occurred relating to the regeneration request (SPN 3696 . . . 10). Then, if the Parked Regeneration switch 601 is UP and regeneration is not needed the transition occurs. Alternatively, if the Parked Regeneration switch 601 is UP and the Inhibit Switch 701 is UP the transition to state 610 occurs.

Transition paths are provided from state 608 (Indicator 50 on continuously) to either "slow" flashing state 610, 612. Either transition requires that the engine controller 22 indicate software unavailability. Then either the inhibit switch 701 must be UP or the engine interlock conditions must fail. These conditions are sufficient to provide transition from state 608 to either slow flashing state 610, 612. Determination of which one depends upon the position of the parked regeneration switch 601. If UP the transition is to slow flashing state 610. If DOWN the transition is to slow flashing state 612.

Referring now to FIG. 7, as before, the default OFF state 702 of the inhibition indicator lamp 60 is assumed upon ignition 141ON. The Regeneration Inhibit switch 701 is preferably a three position mono-stable unit akin to the parking regeneration switch, though it is possible to use a two position bistable switch. An ON state of the indicator lamp 60 is delayed after an inhibit request, an accordingly no direct transition from OFF state 702 to ON state 704 is provided. Instead, an intermediate delay state 706 is provided which is reached from OFF state 702 when the Inhibit switch 701 is UP and the Parked Regeneration switch 601 is not UP and there is no error. Condition set 712 described the circumstances under which the state will transition from delay state 706 back to OFF state 702 after a 10 second delay. The first subset of conditions corresponds to no error occurring and the inhibit switch 701 being moved affirmatively to the down position. A second subset of conditions corresponds to the inhibit switch not being UP and the parked regeneration switch being UP. A third subset occurs with an engine controller message that it is not inhibited by the inhibit switch and the inhibit switch is not UP. Delay state 706 allows up to 10 seconds to satisfy the conditions to move to ON state 704.

A transition from ten second delay state 706 to the inhibit light illuminated state 704 occurs as soon as the transition conditions 714 are met. Transition condition 714 are that there is no error, the inhibit switch is not down and either that the parked regeneration switch is UP or both the inhibit switch and parked regeneration switches are UP, and that engine controller acknowledge that regeneration is inhibited and finally that the ignition not be off. A transition from the delay state 706 or the ON state 704 to an error state 708 follows breakdown in CAN communication or an invalid switch position.

A second transition from the ON state 704 is possible back to the OFF state 702. The condition set 710 describes these circumstances which include: (1) engine OFF; or, (2) there is no error and either the inhibit switch is down or there is a message that the engine controller is not inhibited by the inhibit switch, OR, the inhibit switch in not UP and the parked regeneration switch is UP.

Finally, state transitions are possible between the OFF state 702 and the error state 708. Error state 708 is reached from OFF state 702 upon occurrence of condition set 716, essentially loss of CAN network communication or the occurrence of invalid switch positions. Transition to the OFF state 702 from error state 708 occurs upon restoration (or indication) of good CAN communications with all switch positions being valid, or upon turning the ignition OFF.

Figure 8:
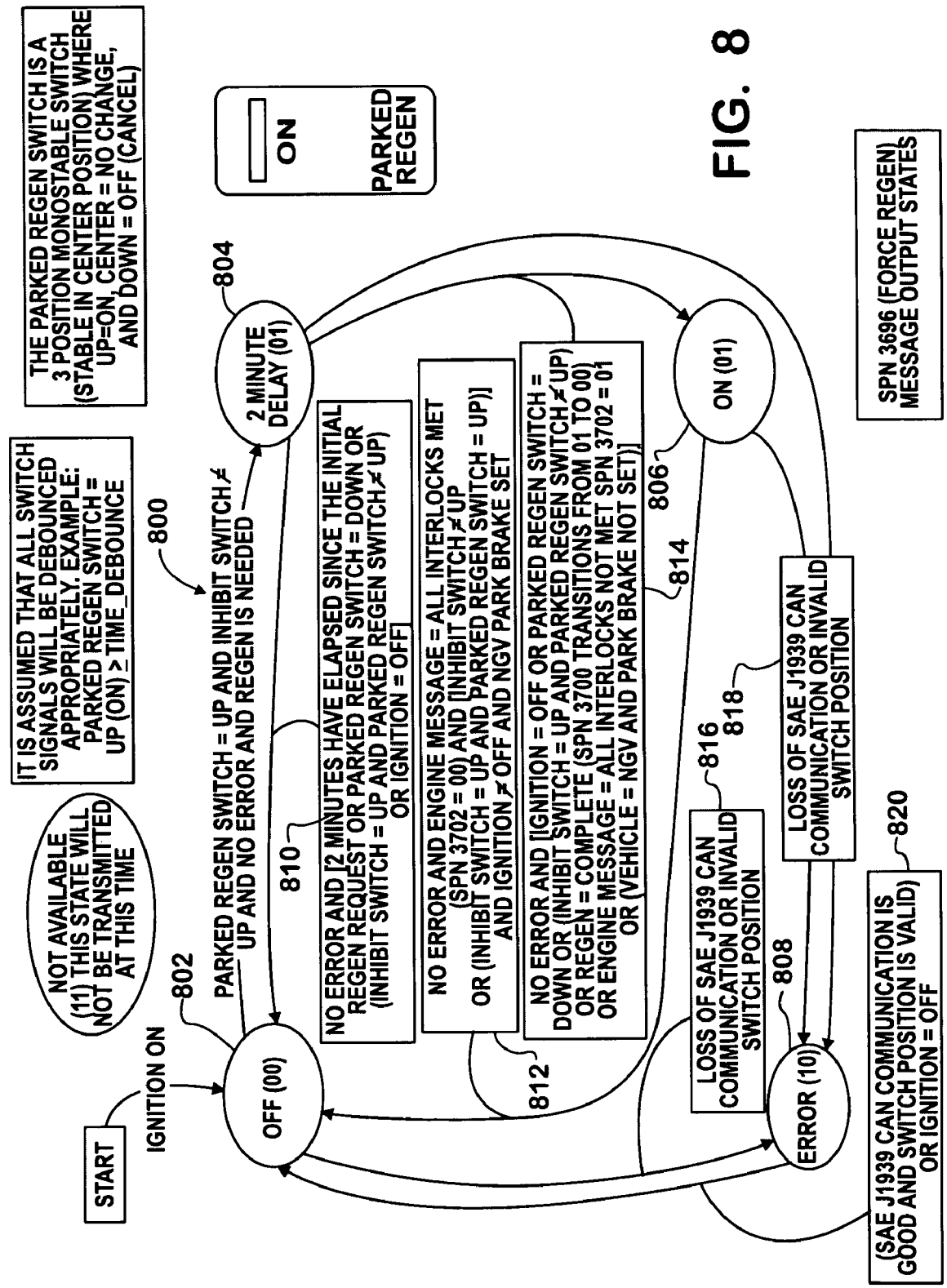
FIG. 8 is a state diagram illustrating the principles of the invention.

Referring to FIG. 8, a state machine defining the value of CAN message SPN 3696 (forced regeneration). As before, the default is termed the OFF state 802, which here corresponds to a message value of "00". The SPN 3696 value is reset in response to actuation of the Parked Regeneration switch 601 and expiration of a delay. Reset of the value begins with the transition from the OFF state 802 to a Two minute delay state 804. The conditions for this transition are that the parked regeneration switch be UP, the inhibit switch not be UP and that regeneration is needed.

A state transition back to the OFF state 802 from delay state 804 is possible. The condition set 810 defines the conditions giving rise to this transition, which occurs if there is no error and the following logical relationship holds true:

the delay period (here two minutes since the regeneration request) and [the Parked Regeneration Switch is down or (the Inhibit switch is UP AND the Parked Regeneration Switch is not UP) OR the Ignition is OFF].

A transition from the two minute delay state 804 to ON state (SPN 3696=01) occurs when condition set 812 is met. Condition set 812 provides:

There is no error AND the Engine controller 22 reports all interlocks have been met AND [the Inhibit Switch is not UP OR (the Inhibit Switch is UP and the Parked Regeneration switch is UP)] AND the Ignition Switch is not OFF and the Park Brake 142 is set.

A transition from the ON state 806 to OFF state 802 occurs upon meeting the requirements of condition set 814. Condition set 814 provides:

That there is no error AND [the Ignition is OFF OR the Parked Regeneration Switch 601 is DOWN OR (the Inhibit Switch 701 is UP AND Parked Regeneration Switch is not UP) OR Regeneration is complete (SPN=3700 transitions from 01 to 00) OR there is an Engine controller 22 message that all interlocks for regeneration have not been met (SPN 3702=01) OR (the vehicle is reported as a selected model and the park brake has not been set)].

The error state follows occurrence of condition sets 818, 816, which are substantively identical. Basically, condition sets 818, 816 are that there has been a loss of CAN communication or an invalid switch position has been detected. The Error state 808 can only be exited to the OFF state 802. This occurs upon reestablishment of good CAN communications with no invalid switch positions, or upon the ignition being turned off.

Using SAE J1939 messaging, indication can be given the operator of the status of DPF regeneration whenever the ignition is on. The operator's required actions are reduced by the simplicity of interface. Other methods utilize a high-temperature exhaust warning indicator to alert the operator to the ongoing DPF regeneration, whereas the algorithm of the present invention determines the status and reports it in the switch indicator of the parked regeneration request switch. Failed interlocks, for example, are reported as a slow blink, while a critical error is reported as a fast blink. A unblinking light means serves as acknowledgment of the requested operation and indicates execution of the operation. Through the interface of the invention, in cooperation with existing an existing controller area network and supplemental programming, operators are given the ability to intervene in DPF regeneration.

While the invention is shown in only a few of its forms, it is not thus limited but is susceptible to various changes and modifications without departing from the spirit and scope of the invention.

What is claimed is:

1. A control system enabling operator intervention in regeneration cycles for a diesel exhaust particulate filter, the system comprising:

a controller area network;

an engine controller connected to the controller area network;

a diesel engine and exhaust system operating under the control of the engine controller;

an ignition switch for controlling on and off states of the diesel engine, a diesel particulate filter connected into the exhaust system, regeneration of the diesel particulate filter occurring by varying engine operation under the control of the engine controller with the engine controller being programmed to initiate regeneration of the diesel particulate filter automatically responsive to particular conditions; and an operator interface providing an operator actuated regeneration inhibit switch and an operator actuated forced regeneration switch and further providing a visual display for indicating regeneration status, the operator interface communicating with the engine controller over the controller area network, the engine controller being responsive an inhibit indication from the operator actuated regeneration switch for suspending automatic response to the particular conditions.

2. A control system according to claim 1, further comprising:

a controller connected to the controller area network programmed to establish states of the operator interface responsive to messages from the engine controller and operator inputs, the states including: (1) Indication that regeneration of the particulate filter is not occurring; (2) Indication that regeneration of the particulate filter is occurring; (3) Indication that regeneration of the particulate filter has been inhibited by operator action.

3. A control system according to claim 2, further comprising:
   the state indicating regeneration of the particulate filter is not occurring follows movement of an engine ignition switch being from off to on or following completion of regeneration.

4. A control system according to claim 3, further comprising:
   the state indicating regeneration of the particulate filter is occurring follows the state indicating that it is not occurring responsive, in part, to operation of the forced regeneration and regeneration inhibit switches.

5. A control system according to claim 4, further comprising:
   the state indicating inhibition of regeneration of the particulate filter follows either the state indicating regeneration or that indicating no regeneration occurring, and occurs responsive to status of the regeneration inhibit switch.

6. A control system according to claim 5, further comprising:
   a state corresponding to delay in indicating inhibition intermediate the states indicating no inhibition and inhibition of regeneration.

7. A control system according to claim 6, further comprising:
   a state indicating an error condition following any other state and occurring responsive to an error or invalid forced regeneration switch position or regeneration inhibit switch position.

* * * * *